United States Patent [19]

Korsky et al.

[11] Patent Number: 4,757,521

[45] Date of Patent: Jul. 12, 1988

[54] SYNCHRONIZATION METHOD AND APPARATUS FOR A TELEPHONE SWITCHING SYSTEM

[75] Inventors: Vincent V. Korsky, Shelton; Chansak Laotetpitaks, Woodbridge, both of Conn.

[73] Assignee: Tie/Communications, Inc., Shelton, Conn.

[21] Appl. No.: 611,094

[22] Filed: May 17, 1984

[51] Int. Cl.[4] .......................... H04L 7/00; H04J 3/06
[52] U.S. Cl. .................................. 375/109; 375/118; 370/103; 370/108; 358/149
[58] Field of Search ...................... 375/109, 118, 108; 370/103, 108; 358/149; 371/47; 455/51

[56] References Cited

U.S. PATENT DOCUMENTS

| | | | |
|---|---|---|---|
| 3,453,592 | 7/1969 | Ishii et al. | 375/109 |
| 3,611,435 | 10/1971 | Cooper | 375/118 |
| 3,824,340 | 7/1974 | Sensney | 358/149 |
| 4,411,007 | 10/1983 | Rodman et al. | 375/109 |
| 4,451,917 | 5/1984 | DeCoursey | 370/108 |

FOREIGN PATENT DOCUMENTS

| | | |
|---|---|---|
| 0131662 | 1/1985 | European Pat. Off. |
| 0038749 | 3/1980 | Japan ......... 375/109 |
| 1341382 | 12/1973 | United Kingdom . |
| 1495787 | 12/1977 | United Kingdom . |
| 1495825 | 12/1977 | United Kingdom . |
| 2095516 | 8/1985 | United Kingdom . |

Primary Examiner—Benedict V. Safourek
Assistant Examiner—Andrew J. Telesz, Jr.
Attorney, Agent, or Firm—Kenyon & Kenyon

[57] ABSTRACT

A method and apparatus for synchronizing a digital data signal from a first location, such as a digital telephone station, and which is transmitted to a second location, such as the station interface of a telephone switching system common equipment input, with a digital data signal at the second location, is disclosed. The method includes transmitting a data signal to the second location from the first location, receiving the data signal at the second location and determining if the data signal is present at a selected time. Digital coded data is sent to the first location from the second location for selecting successive delay times at the first location. When the delayed data signal is present at the second location at the selected time, the optimum value of the delay time is determined at the second location, preferably by averaging the values of the delay times at which the data signal was first detected and last detected at the second location. Digital coded data corresponding to the optimum delay time is then sent to the first location to select the optimum delay time at the first location.

12 Claims, 6 Drawing Sheets

Tx BIPOLAR DATA FORMAT

SYNCHRONIZATION METHOD AND APPARATUS FOR A TELEPHONE SWITCHING SYSTEM

BACKGROUND OF THE INVENTION

The present invention relates to synchronization schemes in telephone switching systems and more particularly, to a method and apparatus for synchronizing digital data signals received from telephone stations coupled to a common equipment unit (CEU), such as a key service unit (KSU), of a telephone switching system, to the time base of the CEU. Such synchronization is necessary because of the variable delays encountered in transmitting data to and from remotely located telephone stations over the station transmission lines.

In order to synchronize data from digital telephones relative to the timing in the CEU or KSU, it is necessary to provide a means for compensating for the external delays that are encountered. A phone that can be located a variable distance from the KSU will encounter delays caused by the propagation delay of the transmission media. For standard twisted pair, the propagation delays are on the order of 2 $\mu$secs. per kilofoot of cable. Thus, if a phone is located at 2 kilofeet from the KSU, a loop delay of 4 microseconds will be encountered (2 $\mu$secs. to the phone and 2 $\mu$secs. back). In order to compensate for these delays, a method and apparatus for determining the amount of delay and for compensating for this delay is required.

SUMMARY OF THE INVENTION

It is an object of the present invention to provide a method and apparatus for synchronizing data from a digital telephone station to the time base of a common equipment unit of a telephone switching system.

It is a further object of the present invention to provide a method and apparatus for compensating for the signal phase delays caused by propagation delays in telephone transmission lines.

It is yet a further object to provide such a method and apparatus which can be applied to a digital telephone switching system wherein voice data transmission between the telephone stations and the common equipment unit is in digitized form, e.g. PCM data.

These and other objects of the present invention are achieved by apparatus for synchronizing a digital data signal from a first location transmitted to a second location, with a digital data signal at the second location, comprising means at the first location for transmitting a data signal to the second location, means at the second location receiving the data signal for determining if the data signal is present at a selected time, means at the second location for transmitting coded data to the first location, means at the first location responsive to the coded data for varying a delay time after which the data signal is transmitted to the second location, whereby when the means for determining detects the presence of the data signal at the second location at the selected time, the means for transmitting transmits coded data to the first location to select a value of the delay time such that the data signal is present at the selected time at the second location.

A method in accordance with the apparatus is also described. Other objects, features and advantages of the present invention will appea from the detailed description which follows.

BRIEF DESCRIPTION OF THE DRAWINGS

The present invention will be described in greater detail in the following detailed description with reference to the drawings, in which.

DETAILED DESCRIPTION

Figure 1:
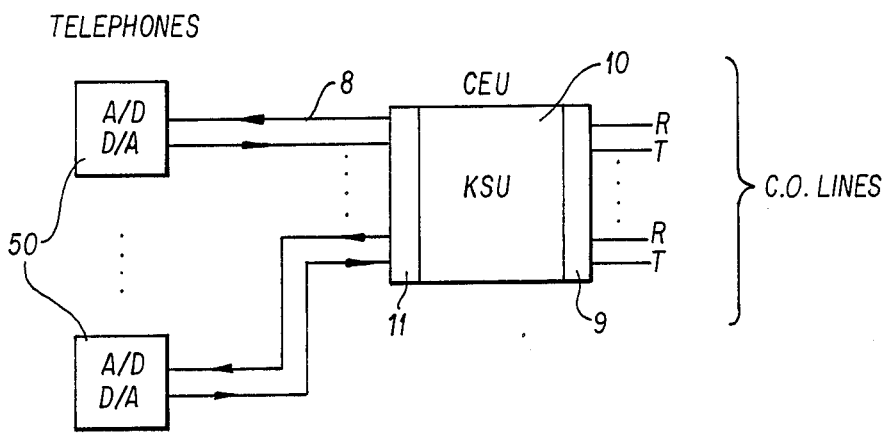
FIG. 1 is a block diagram indicating the connection between digital telephones and a common equipment unit of a telephone switching system.

With reference now to the drawings, FIG. 1 shows the basic interconnections between a common equipment unit 10 (CEU), such as a key service unit (KSU) of a key telephone switching system, and a plurality of digital telephones 50. KSU 10 includes a station interface 11 coupled to the data transmission lines 8 connecting the telephones to the KSU and a trunk interface 9 connecting the KSU to outside trunk or central office (C.O.) lines. Digital telephones 50 have appropriate A/D and D/A converters for converting voice signals to digital form for transmission to the KSU and for receiving and converting digital signals from the KSU to analog voice signals.

Figure 2:
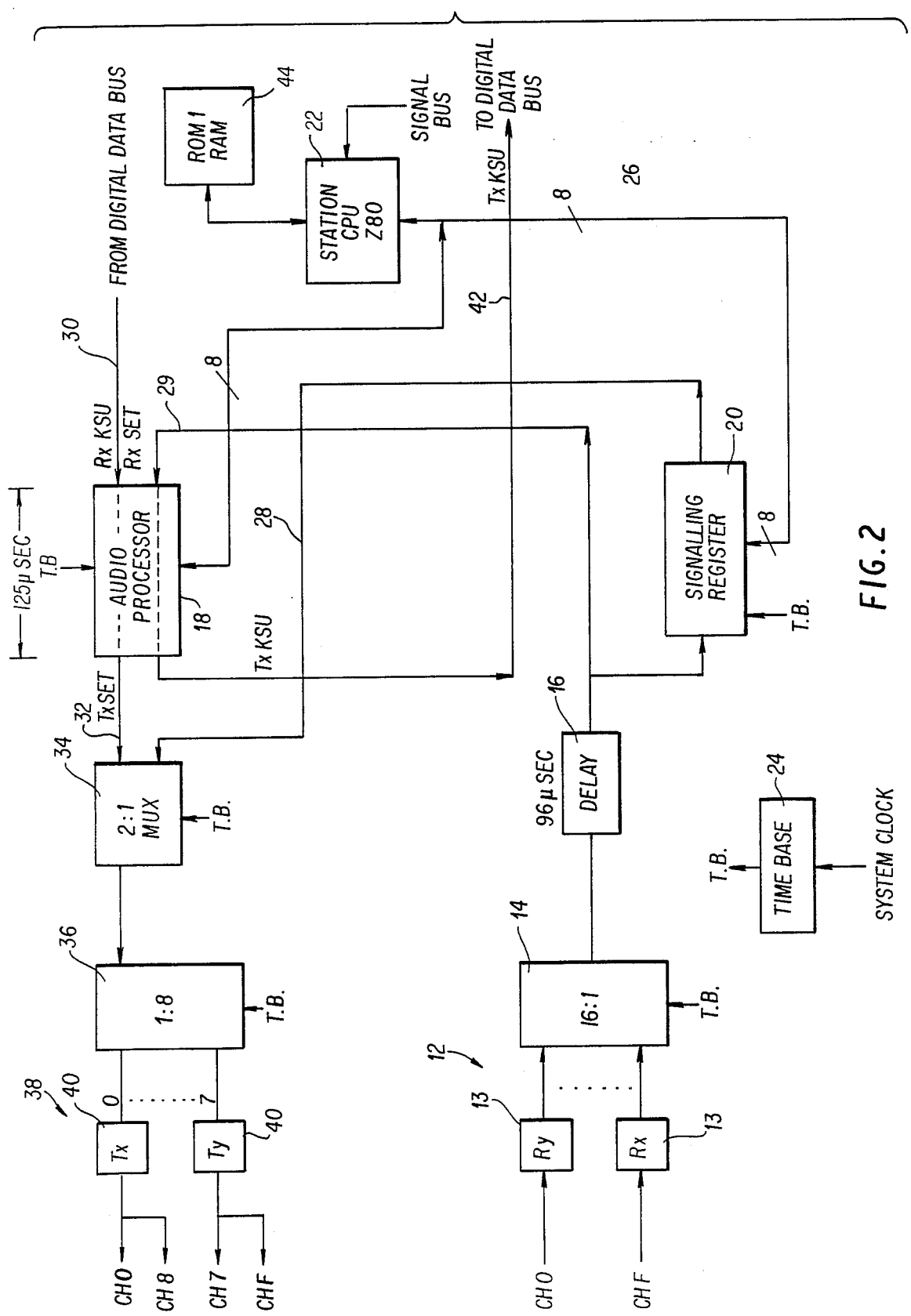
FIG. 2 is a more detailed block diagram of the station interface of the common equipment unit.

FIG. 2 shows the relevant circuitry in the station interface 11 of KSU 10. For more details, the reader is directed to the copending application of Vincent Viacheslav Korsky and Chansak Laotetpitaks entitled STATION INTERFACE FOR DIGITAL ELECTRONIC TELEPHONE SWITCHING SYSTEM HAVING CENTRALIZED DIGITAL AUDIO PROCESSOR, filed May 16, 1984. The station interface includes a receive interface 12 including receive isolation circuitry 13 for each channel and multiplexer 14 for converting the plurality of data streams from the, illustratively, 16 individual telephone stations 50 to a time division multiplexed serial signal. The serial output of multiplexer 14 is delayed by a fixed delay stage 16, shown in the illustrated embodiment as a 96 $\mu$sec delay. The output of delay stage 16 is then routed to one input of digital audio processor 18 and signalling register 20. Audio processor 18 and signalling register 20 are under the control of a station CPU 22, such as a Z80 microprocessor manufactured by Zilog Corp. Signals coupled to the signalling register 20 and audio processor 18 must be synchronized to the system time base, generated by a time base generator 24, which is controlled by a system clock signal.

Signalling register 20 is used by the station CPU 22 to both, via the CPU data bus 26, read signalling control data interleaved in the serial signal from the telephones and to write signalling control data into the serial data streams out to the telephone via line 28.

Audio processor 18 digitally modifies the gain levels of the audio signals both from the telephones coupled to the receive interface 12 (line 29) and from other digital signals 30 coming from system digital data buses and originating from either other telephones coupled to other station interfaces in the system or from outside trunk C.O. lines. These signals are already synchronized with the system time base 24. In the embodiment illustrated, the system time base is determined by the sampling rate of the PCM signals present on the digital data buses, which is 8 KHz, corresponding to a sampling period of 125 $\mu$secs. Accordingly, incoming signals from the telephones must be synchronized to this 125 $\mu$sec. period if the signals are to be interpreted properly by both the audio processor 18 and signalling register 20.

Following processing of both the data 30 from the digital data buses and the data 29 from the telephones by digital audio processor 18, the data 32 to be transmitted to the telephones is forwarded to multiplexer 34 wherein the signalling control data from signalling register 20 is interleaved into the data 32. The combined digital voice and signalling data is fed to demultiplexer 36 of transmit interface 38 and the demultiplexed signals are coupled via isolation circuitry 40 to the individual telephones. A special coding scheme may be utilized so that two telephone stations can share a common data transmission path, as shown. The reader is referred to the copending application of Vincent Viacheslav Korsky, filed Apr. 3, 1984 entitled DUAL CHANNEL TRANSMISSION METHOD AND APPARATUS WITH INHERENT CHANNEL IDENTIFICATION AND EXTRACATION, for details.

Data received from the telephones and processed by audio processor 18 is coupled back to a digital data bus via line 42 for transmission to other telephones in the system or to external trunk lines.

Programs for controlling the operation of audio processor 18 as well as for the determination of and compensation for the phase delays are resident in program memory 44 coupled to station CPU 22. The latter program will be described in more detail with reference to FIGS. 7A and B.

Figure 3:
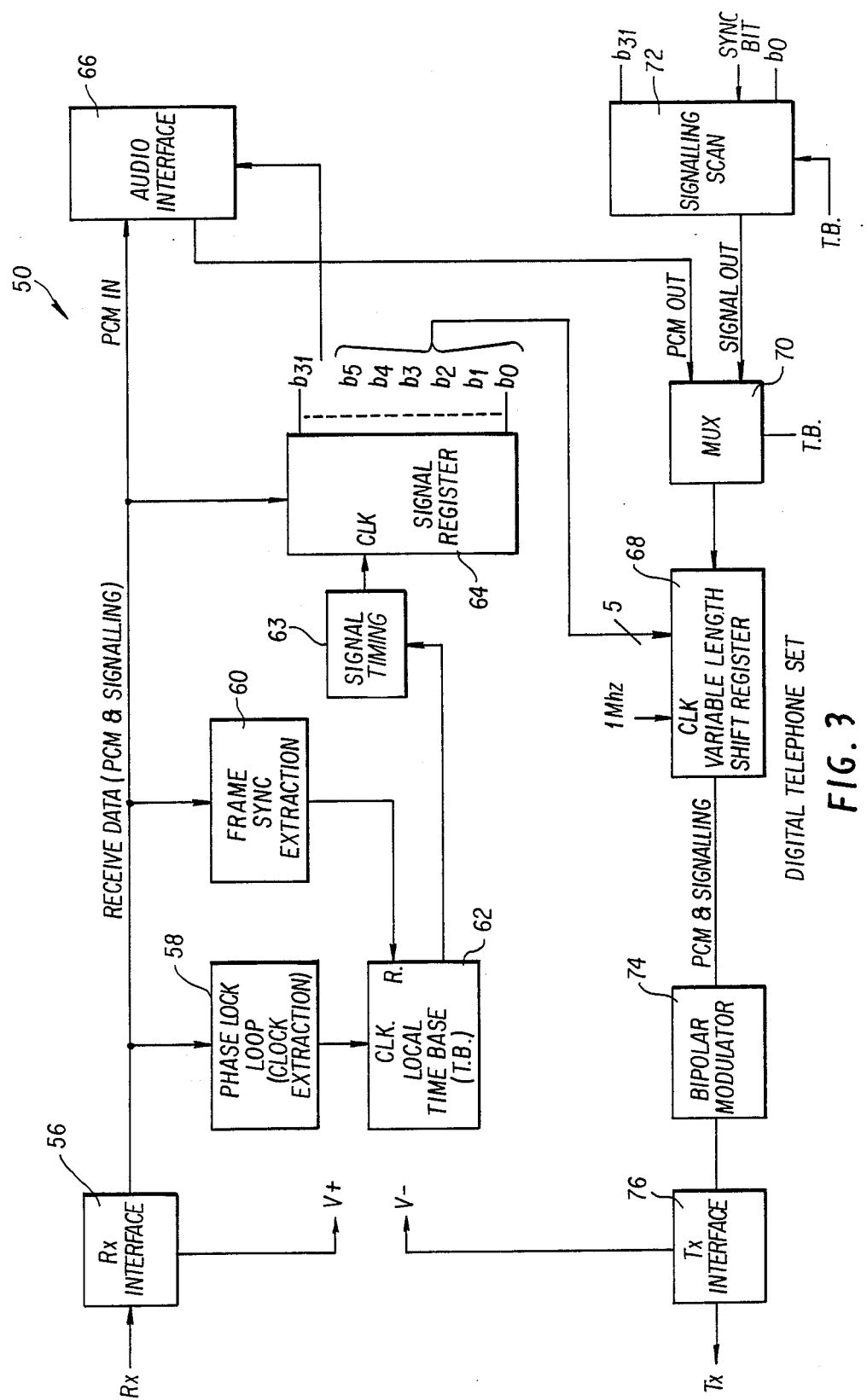
FIG. 3 is a more detailed block diagram of one of the digital telephone stations.
Figure 5:
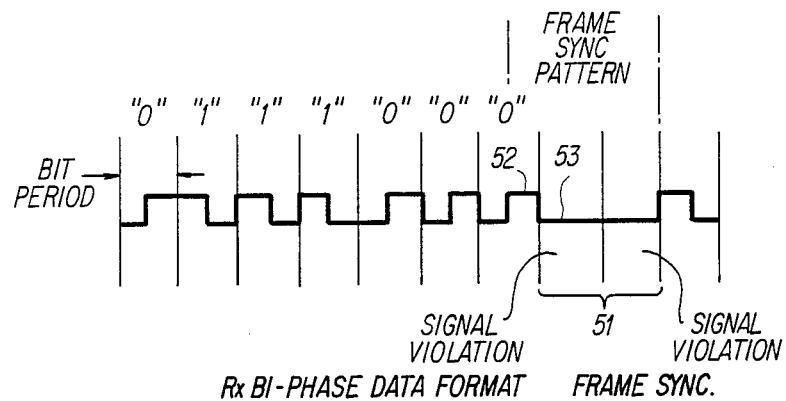
FIG. 5 illustrates the data format for data signals transmitted to the telephone station by the common equipment unit.

The block diagram of a digital telephone 50 is shown in FIG. 3. The receive (Rx) (relative to the telephone) digital data stream format is shown in FIG. 5. The Rx data is bi-phase modulated and consists of interleaved PCM data and signalling control data. Signalling data is interleaved with the PCM data at 1 ms intervals, the least significant bit of the PCM word being replaced with one bit of signalling data every millisecond. The signalling data message is 32 bits long. A signalling synchronization time marker is sent once every 32 ms to synchronize the telephone time base. The frame sync pattern that is sent is one that normally never occurs in bi-phase data transmission, i.e., the bi-phase modulation is violated in that data transitions are inhibited in the middle of the bit periods, as shown by periods 51 in FIG. 5. The frame sync pattern consists, illustratively, of a one half bit period of one level 52 followed by two consecutive bit periods of the opposite level 53, as shown in FIG. 5.

With reference again to FIG. 3, the digital telephone 50 includes a receive interface 56 for receiving data from the station interface of the KSU. A phase locked loop 58 is used to extract a clock signal from the bi-phase modulated signal from the KSU shown in FIG. 5. Appropriate gating circuitry 60 extracts the frame synchronization marker from the received data. These signals are used to generate and synchronize, respectively, the system time base 62. Time base 62 is used to synchronize signal register 64 so that the 32 bits of signal data are present in the register at the end of each 32 msec. period. The presence of the frame sync pattern resets the local telephone time base 62, thus synchronizing the telephone to the incoming Rx data stream. After the telephone time base is synchronized, timing can then be generated to properly receive the PCM data and every 1 ms extract a bit of interleaved signalling data. This is shown by block 63. The signalling data is stored in the signal register 64. Up to 32 signalling bits are stored for each signalling frame period (32 ms). These signalling bits are used to control the state of various telephone circuits under direct control of the KSU.

The received data is also fed to audio processing circuitry 66 wherein the PCM voice data is processed.

As shown in FIG. 3, five bits received from the KSU are set aside for implementing the variable phase delay. The remaining 27 bits are used for performing other functions such as LED flashing, for example.

The five delay control bits address a variable length shift register 68 which implements the delay. Essentially, this shift register is a shift register having a plurality of output taps which are selected by the addressing 5 bits. A multiplexer 70 couples both digitized audio from audio circuitry 66 and signalling control data from signalling scan circuitry 72. Scan circuitry 72 scans the keys of the telephone to determine if they have been operated and generates a serial output to multiplexer 70 which is interleaved into the digitized voice signals to inform the KSU what keys are depressed for example, indicating what functions and call connections are desired.

The scan circuitry is controlled by the local time base 62 so that the scanning is synchronized to the received data stream. One of the 32 outgoing control bits is assigned as the sync bit, as shown by 71, and is always maintained at the same logic level. The output of the variable length shift register 68 is then coupled to bipolar modulator 74 and transmit interface 76. Bipolar modulator 74 modulates the data from shift register 68 into the form shown in FIG. 6.

The variable length shift register (VLSR), as mentioned, is a register that has addressable taps at the output of each register stage. By selecting an appropriate tap, the delay between output and input can be varied. In the illustrated embodiment, the VLSR has 32 stages of registers that are clocked at 1 microsecond intervals. 32 taps can be selected by a 5 bit address control. Thus a delay range of 0 to 32 microseconds, in increments of 1 microsecond, may be implemented. As mentioned above, the 5 delay address bits are obtained from the output of signal register 64.

Figure 6:
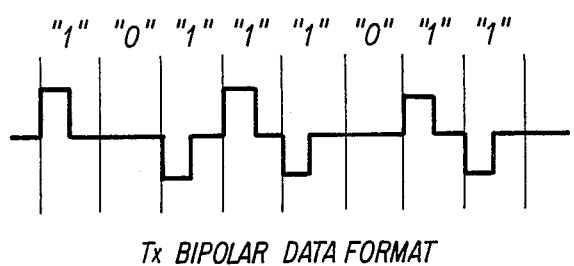
FIG. 6 illustrates the data format of signals transmitted from the telephone station to the common equipment unit.

Data that is sent from the telephone to the KSU also consists of PCM data and signalling data. The interleaving is similar to the Rx data in that one signalling bit is transmitted every 1 ms in the least significant bit position of every 8th PCM word. However, the data modulation is bipolar in format as shown in FIG. 6.

Figure 4:
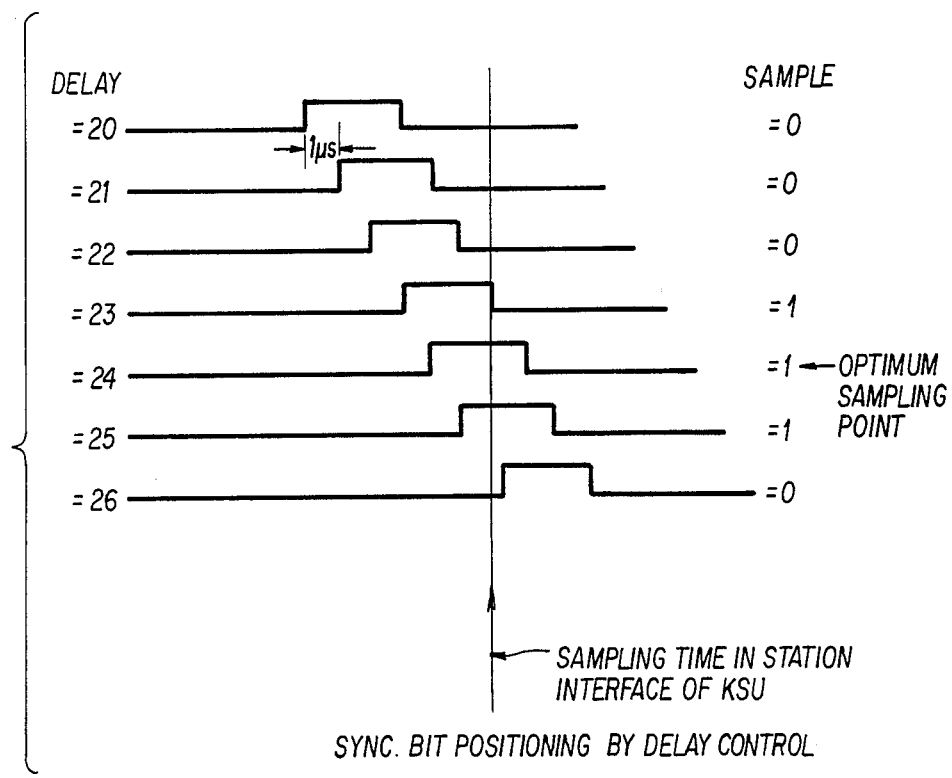
FIG. 4 is a timing diagram illustrating the manner of determining the phase delay due to the transmission lines at the common equipment unit.
Figure 7A:
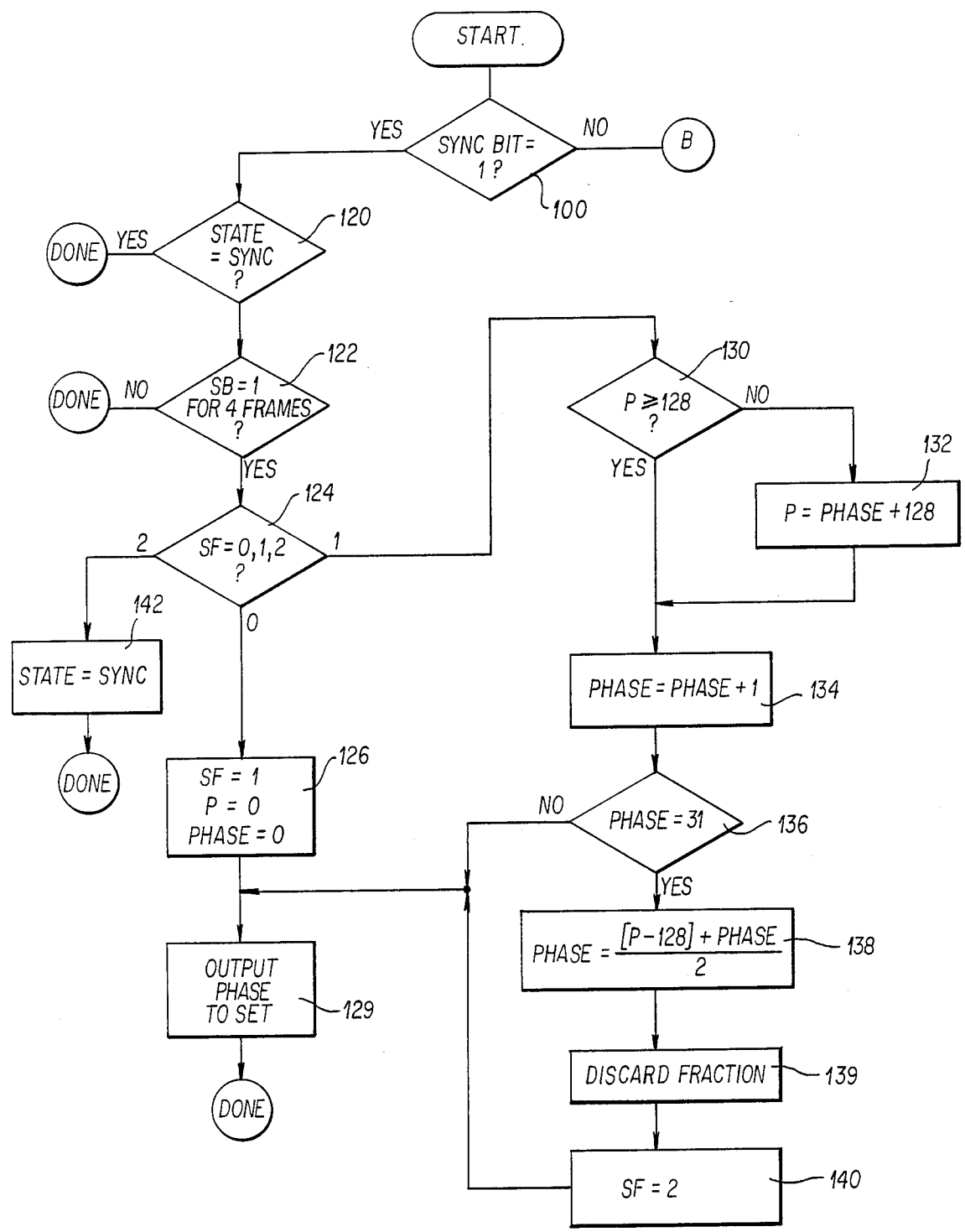
FIGS. 7A and 7B combined are a flowchart of a program which may be resident in a program memory of the station interface of the common equipment unit for determining and compensating for the phase delay.
Figure 7B:
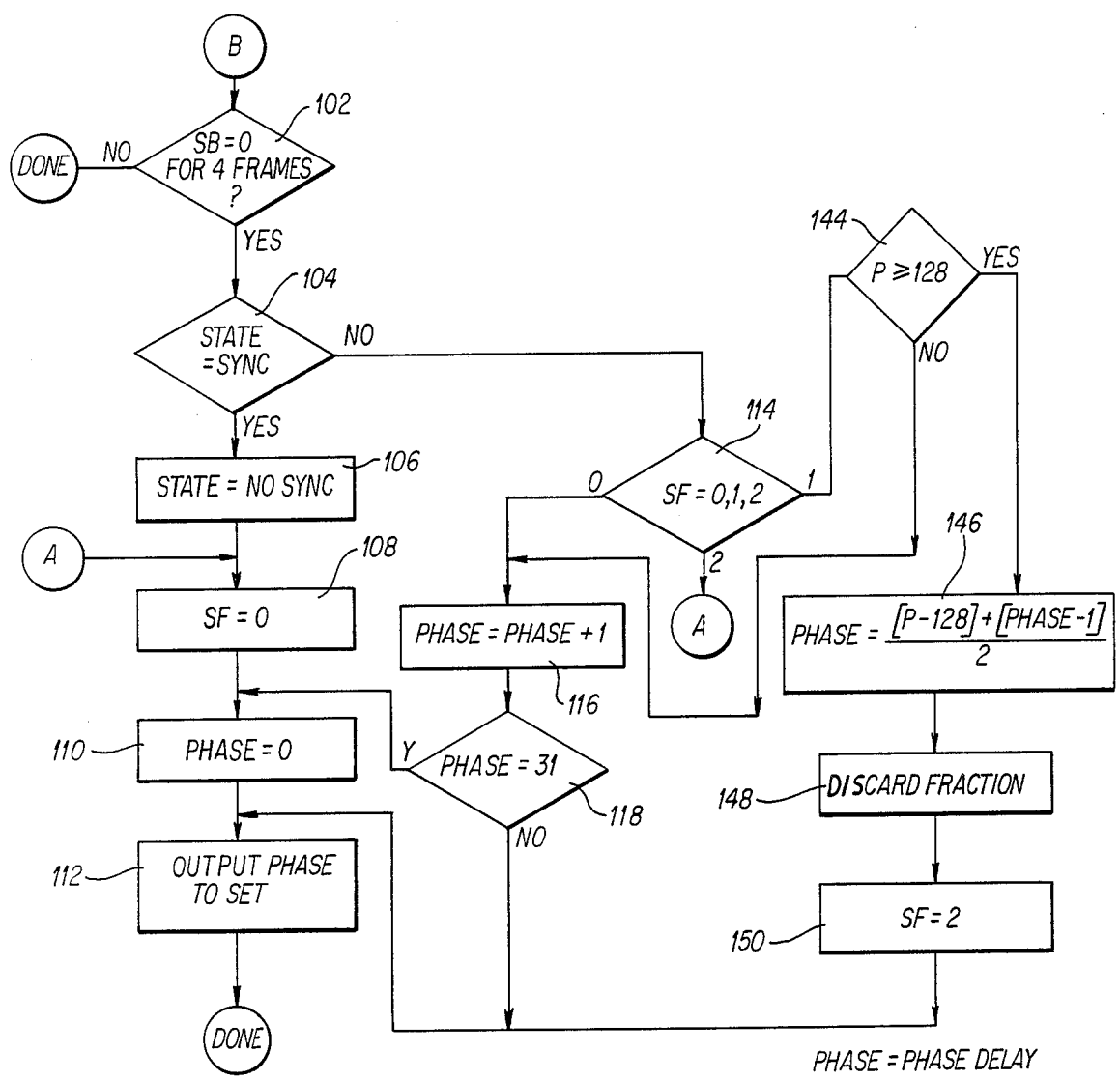

To synchronize the data stream from the telephone with the time base 24 of the station interface of the KSU, a software controlled procedure is used to adaptively adjust the delay of the VLSR to compensate for the loop delay. The program is stored in memory 44 and the flowchart of the program is shown in FIGS. 7A and 7B. As mentioned above, one of the Tx signalling bits is dedicated as a signalling frame marker or sync bit that is used in aligning the data stream from the telephone to the time base of the station interface of the KSU. When the telephone requires synchronization, transmission of PCM is inhibited and the station interface CPU 22 searches the data stream in the location for the sync bit in signalling register 20. This procedure is shown graphically in FIG. 4. The station interface CPU 22 initially sets the delay address bits in signalling register 20, for transmission to signal register 64 in the telephone, to a count of zero and then monitors the signalling from the telephone for the presence of the sync bit. If the sync bit is not present in a certain period of time, the CPU, under control of the software, increments the delay address for VLSR 68 by one, thus implementing an additional microsecond delay in the data stream from the telephone, and again monitors the data stream for the presence of the sync bit in the proper location in signalling register 20. If the sync bit is not present, the delay is continuously incremented in one microsecond increments until sync bit presence is detected. This is shown in FIG. 4 for the situation where the sync bit approaches and passes its proper location in the signalling register 20, illustratively for counts of 20 to 26 $\mu$secs. At a delay count equal to 23 $\mu$secs., the sync bit is detected as shown by the setting of the sample bit to 1. This delay count is stored and the count is again continuously incremented until the sync bit is no longer present, as shown for a count equal to 26 $\mu$secs. The program then calculates an average value of delay which corresponds approximately to the center of the sync bit position, as shown for a delay count equal to 24 $\mu$secs. This count is the optimum delay for sampling of the telephone data and the delay address bits corresponding in binary to the optimum value of delay are transmitted to the telephone to address VLSR 68 until a new failure of synchronization occurs, at which point the procedure is reimplemented.

Accordingly, by placing a variable delay in the telephone station, the delay over the transmission lines connecting the telephones and the station interface of the KSU can be compensated. For example, in the case of a total transmission delay over the transmission lines of 7 $\mu$secs. (3.5 $\mu$secs. transmit and return), a delay of 24 $\mu$secs. would be set in the telephone. A fixed delay of 96 $\mu$secs. is performed by delay stage 16 in the station interface of the KSU for a total of (96+7+24) $\mu$secs., or 125 $\mu$secs. Since the time base of the KSU is locked to the 125 $\mu$sec. sampling period of the PCM data, signals received by the station interface at the output of delay stage 16 must be delayed by intervals of 125 $\mu$secs. or multiples thereof in order to synchronize with the time base.

The flowchart of the synchronization program utilized to implement the variable delay is shown in FIGS. 7A and 7B. The synchronization program is executed once every 32 msecs. One program frame equals 32 msecs. With reference to these figures, the CPU first determines if a SYNC bit is present at 100. If a SYNC bit is not present, program flow is to point B in FIG. 7B. At 102, a check is made to determine if the sync bit (SB) has been 0 for four 32 msec. program frames, i.e., 128 msec. If it has not, the program terminates and returns to START to begin the next 32 msec. program frame. Once the SYNC bit is 0 for four frames, a check is made at 104 to determine if the telephone set was formerly in a state of synchronization. Assuming that it was, it is now declared to be in a state of NOSYNC at 106. A program state counter SF is then set to 0 at 108, the phase counter PHASE (the address of the VLSR delay) is set to 0 at 110, and the PHASE (now 0) is transmitted to the telephone station at 112. A return to START is then made.

In the next program frame, the SYNC bit check is again made at 100. Assuming no SYNC bit is detected, exit to point B is made. Again the program checks to determine if it has gone through four frames and has not found the SYNC bit. Assuming that the SYNC bit was still 0 for four program frames, the SYNC state is checked again at 104. Since the telephone was formerly declared to be out of sync, decision block 114 is entered. At this point the SF counter is checked. As SF was formerly set to 0, meaning the SYNC bit has not been detected, program branch is to step 116. At this point, the PHASE counter is incremented by 1. A check is made at 118 to determine if PHASE has reached 31 (the longest delay). If it has not, the incremented present value of PHASE is transmitted to the telephone at step 112. If PHASE has reached 31, PHASE is reset to 0. This would indicate that no SYNC bit was ever detected, meaning that no telephone is connected to that channel.

Eventually, as PHASE is incremented, the SYNC bit will be detected, as shown in FIG. 4. Program flow will then be to 120 in FIG. 7A. The SYNC state is checked at 120, and assuming this to be the first time the SYNC bit was detected, the test will be false, since the SYNC state was formerly not equal to SYNC. Accordingly, the program branches to 122, and a check is made to determine if the SYNC bit has been one for four program frames. If it has not, a return to START is made. Once the SYNC bit has been equal to 1 for four frames, step 124 is performed. Since SF still equals 0, because it has not as yet been set, step 126 is entered and SF is set to 1 (to indicate the SYNC bit has been detected once for 4 program frames), P is set to 0 (P is a location into which the PHASE values are stored) and PHASE is set to 0. At 129, the present value of PHASE, now 0, is transmitted to the telephone and a return to START is made.

The program is again reexecuted, and a check is made to determine if the SYNC bit is present for four frames. Assuming the SYNC bit to be present for four frames, at step 124, SF is now 1. Therefore, a branch to 130 is made. At 130, a check is made to determine if P is greater than or equal to 128 in decimal, i.e., the most significant bit (bit 8) is checked to determine if it is set. This bit is only set to indicate that value of PHASE at which the SYNC bit first was sampled. Assuming that this bit has not been set, a branch is made to 132, and the most significant bit of P is set and P is set equal to the present value of PHASE, i.e., the value of PHASE at which the SYNC bit was first sampled. This indicates that P has been set to the PHASE value at which the SYNC bit was first detected for four frames. At 134, the PHASE counter is incremented by 1. A check at 136 is made to determine if PHASE has reached 31. If it has not, the present value of PHASE is transmitted to the telephone. If PHASE equals 31 (meaning that the maximum delay has been reached and the SYNC bit is still present), the optimum PHASE value is calculated as the value of P (less the most significant bit—128) plus the present value of PHASE (31) divided by 2. This is done at step 138. At 139, the fractional part of the result is discarded. Theoretically and logically, the program could calculate an optimum delay of 15 based on a P value equal to 0 and a last PHASE value equal to 31. Practically, however, such a a result would not occur. At 140, the SF counter is then set to 2 and eventually SYNC would be declared at 142.

Assuming that at some point when the program returns to START and before PHASE has reached 31, the SYNC bit will no longer be detected, meaning that the PHASE value has increased past the point of synchronization, a return to point B of FIG. 7B will be made. Once the SYNC bit has been undetected for four program frames at 102, a check is made at 104 for the state of synchronization. Since the state SYNC has not yet been declared, a branch is made to step 114. At this point, SF is now 1 (having been set to 1 at step 126 in FIG. 7A). A branch is made to 144 and the most significant bit of P is checked. If it is set, meaning that the first delay value at which the SYNC bit was located has been determined, then the optimum PHASE value is calculated at 146 as the value of P (less the most significant bit—128) plus the value of PHASE at which the SYNC bit was last detected (PHASE-1) divided by 2. At 148, a fractional part of the result is discarded. SF is then set to 2 at 150, and the optimum PHASE is transmitted to the telephone at 112.

The program returns to start, and since the optimum phase delay is being utilized, the SYNC bit will be present at 100, and present for four frames at 122. At step 124, a branch is made to 142 and SYNC is declared.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus for synchronizing a first data signal from a first location transmitted to a second location, with a second data signal present at the second location, comprising:

means at the first location for transmitting said first data signal to the second location, said means for transmitting including means for delaying said first signal by an adjustable delay time;

means at the second location receiving said first data signal for determining if said first data signal is present at a selected time in synchronism with said second data signal;

means at the second location for transmitting coded data associated with respective values of said adjustable delay time to said first location;

said delay means at the first location being responsive to said coded data for varying the delay time as said first data signal is being transmitted to the second location;

whereby when said means for determining at the second location detects the presence of said first data signal at said second location at the selected time, said means at said second location for transmitting transmits a selected one of said coded data to said first location associated with a value of the delay time which maintains synchronism between said first data signal and the second data signal at the second location, said selected one of said coded data selecting the value of said delay time so as to implement said delay time at said first location such that the first data signal is present at the selected time at said second location; said means for determining further comprising:

means for sampling said first data signal at a selected time;

means for identifying a first delay time when a portion of said first data signal first occurs at said selected time and for identifying a second delay time when a portion of said first data signal last occurs at said selected time; and means for calculating an optimum delay time between said first and second delay times.

2. The apparatus recited in claim 1 wherein said first data signal comprises a digital data signal and said means for varying the delay time comprises variable length shift register means for delaying said first data signal in successive increments determined by said coded data.

3. The apparatus recited in claim 2 wherein said means for determining comprises digital computer means.

4. The apparatus recited in claim 1 wherein said coded data comprises coded digital data and said means for transmitting coded data to said first location comprises counting means for varying said coded data in increments, each increment corresponding to a different delay time.

5. The apparatus recited in claim 6 wherein said means for transmitting further comprises register means receiving said coded digital data.

6. The apparatus recited in claim 1 wherein said means for identifying comprises means for generating a first number associated with said first delay time and means for generating a second number associated with said second delay time and said means for calculating comprises means for averaging said first and second numbers.

7. The apparatus recited in claim 1, further comprising fixed delay means at said second location.

8. A method for synchronizing a first data signal from a first location transmitted to a second location, with a second data signal present at the second location, comprising the steps of:

transmitting from the first location said first data signal to the second location, said step of transmitting including delaying said first signal by an adjustable delay time;

receiving at the second location said first data signal and determining at the second location, if said first data signal is present at a selected time in synchronism with said second data signal;

transmitting from the second location coded data associated with respective values of said adjustable delay time to said first location;

varying, at said first location, in response to said coded data, said delay time as said first data signal is transmitted to the second location;

whereby when the presence of said first data signal is detected at said second location at the selected time, a selected one of said coded data is transmitted to said first location associated with a value of the delay time which maintains synchronism between said first data signal and the second data signal at the second location, said selected one of said coded data selecting the value of said delay time so as to implement said delay time at said first location such that the first data signal is present at the selected time at said second location; said step of determining further comprising:

sampling said first data signal at a selected time;

identifying a first delay time when a portion of said first data signal first occurs at said selected time, and identifying a second delay time when a portion of said first data signal last occurs at said time; and calculating an optimum delay time between said first and second delay times.

9. The method recited in claim 8 wherein said step of identifying comprises generating a first number associated with said first delay time and generating a second number associated with said second delay time and said step of calculating comprises the step of averaging said first and second numbers.

10. The method recited in claim 9 wherein said step of transmitting coded data to said first location comprises transmitting coded digital data, and further comprising the step of varying said coded digital data in increments, each increment corresponding to a different delay time.

11. The method recited in claim 8 wherein said first data signal comprises a digital data signal and wherein said step of varying the delay time comprises varying the length of a shift register.

12. The method recited in claim 8, further comprising the step of delaying said first data signal at said second location.

* * * * *